United States Patent Office 3,573,031
Patented Mar. 30, 1971

3,573,031
METHOD OF CONTROLLING WEEDS
Harry Tilles, El Cerrito, Calif., assignor to Stauffer Chemical Company, New York, N.Y.
No Drawing. Continuation-in-part of application Ser. No. 106,444, May 1, 1961. This application Apr. 27, 1964, Ser. No. 362,948
Int. Cl. A01n 9/12; C07d
U.S. Cl. 71—100
9 Claims

ABSTRACT OF THE DISCLOSURE

This invention relates to the use of certain compositions as herbicides. More particularly, it has been found that certain alkyl 1-hexamethyleneimine-carbothiolates possess valuable herbicidal properties and are particularly useful as pre-emergence herbicides.

---

This application is a continuation-in-part of application Ser. No. 106,444, filed May 1, 1961, now abandoned.

The compounds of the present invention are represented by the following formula:

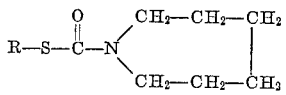

wherein R is a lower alkyl group.

The closest known prior art to the instantly claimed invention is U.S. Pat. 2,913,327 which discloses ethyl-1-pentamethylene carbothiolate (therein referred to as R–1817).

The following illustrative examples demonstrate the methods which may be employed to make typical compounds of the present invention.

EXAMPLE I

Compound 1.—Methyl 1-hexamethyleneiminecarbothiolate

A 500 cc. flask was provided with stirrer, thermometer and addition funnel. A solution of 14.0 g. (0.35 mole) of sodium hydroxide in 200 cc. of water was charged to the flask and this was followed by the addition of 31.7 g. (0.32 mole) of hexamethyleneimine in 100 cc. of n-pentane. To the vigorously stirred mixture with cooling was then added 33.2 g. (0.30 mole) of methyl chlorothiolformate. The temperature of the reaction mixture was maintained at 15–20° C. After the addition was completed, the mixture was stirred for an additional 5 minutes and then phase separated. The upper organic phase was washed with 2–50 cc. portions of dilute hydrochloric acid (5 cc. of conc. hydrochloric acid made up to a volume of 55 cc. with water) and with 3–50 cc. portions of water. It was then dried over anhydrous magnesium sulfate, filtered and concentrated on the steam bath. The residual liquid was then fractionally distilled under vacuum. There was obtained 46.6 g. (90.0% yield) of methyl 1-hexamethyleneiminecarbothiolate, B.P. (10 mm.) 129.5–130.5° C., $n_D^{30}$ 1.5235.

Analysis.—Calculated for $C_8H_{15}NOS$ (percent): N, 8.08. Found (percent): N, 7.96.

EXAMPLE II

Compound 2.—Ethyl 1-hexamethyleneimine-carbothiolate

When the general procedure of Example I was repeated except that 31.7 g. (0.32 mole) of hexamethyleneimine, 37.4 g. (0.30 mole) of ethyl chlorothiolformate, 14.0 g. (0.35 mole) of sodium hydroxide dissolved in 200 cc. of water and 100 cc. of n-pentane were employed, there was obtained 51.9 g. (92.3% yield) of ethyl 1-hexamethyleneiminecarbothiolate, B.P. (10 mm.) 136.5–137.0° C., $n_D^{30}$ 1.5156.

Analysis.—Calculated for $C_9H_{17}NOS$ (percent): N, 7.48. Found (percent): N, 7.69.

EXAMPLE III

Compound 3.—n-Propyl 1-hexamethyleneiminecarbothiolate

When the general procedure of Example I was repeated except that 31.7 g. (0.32 mole) of hexamethyleneimine, 41.6 g. (0.30 mole) of n-propyl chlorothiolformate, 14.0 g. (0.35 mole) of sodium hydroxide dissolved in 200 cc. of water and 100 cc. of n-pentane were employed, there was obtained 55.8 g. (91.8% yield) of n-propyl 1-hexamethyleneiminecarbothiolate, B.P. (10 mm.) 148.0–148.5° C., $n_D^{30}$ 1.5108.

Analysis.—Calculated for $C_{10}H_{19}NOS$ (percent): N, 6.96. Found (percent): N, 7.21.

EXAMPLE IV

Compound 5.—n-Butyl 1-hexamethyleneimine-carbothiolate

When the general procedure of Example I was repeated except that 31.7 g. (0.32 mole) of hexamethyleneimine, 45.8 g. (0.30 mole) of n-butyl chlorothiolformate, 14.0 g. (0.35 mole) of sodium hydroxide dissolved in 200 cc. of water and 100 cc. of n-pentane were employed, there was obtained 61.8 g. (95.8% yield) of n-butyl 1-hexamethyleneiminecarbothiolate, B.P. (10 mm.) 161.0–161.5° C., $n_D^{30}$ 1.5073.

Analysis.—Calculated for $C_{11}H_{21}NOS$ (percent): N, 6.50. Found (percent): N, 6.58.

EXAMPLE V

Compound 7.—Sec-butyl 1-hexamethyleneimine-carbothiolate

When the general procedure of Example I was repeated except that 31.7 g. (0.32 mole) of hexamethyleneimine, 45.8 g. (0.30 mole) of sec-butyl chlorothiolformate, 14.0 g. (0.35 mole) of sodium hydroxide dissolved in 200 cc. of water and 100 cc. of n-pentane were employed, there was obtained 60.5 g. (93.9% yield) of sec-butyl 1-hexamethyleneiminecarbothiolate, B.P. (10 mm.) 150.5–151.0° C., $n_D^{30}$ 1.5069.

Analysis.—Calculated for $C_{11}H_{21}NOS$ (percent): N, 6.50. Found (percent): N, 6.68.

EXAMPLE VI

Compound 8.—t-Butyl 1-hexamethyleneimine-carbothiolate

When the general procedure of Example I was repeated except that 31.7 g. (0.32 mole) of hexamethyleneimine, 45.8 g. (0.30 mole) of t-butyl chlorothiolformate, 14.0 g. (0.35 mole) of sodium hydroxide dissolved in 200 cc. of water and 100 cc. of n-pentane were employed, there was obtained 58.2 g. (90.3% yield) of t-butyl 1-hexamethyleneiminecarbothiolate, B.P. (10 mm.) 139.0–140.0° C., $n_D^{30}$ 1.5058.

Analysis.—Calculated for $C_{11}H_{21}NOS$ (percent): N, 6.50. Found (percent): N, 6.61.

EXAMPLE VII

Compound 4.—i-Propyl 1-hexamethyleneimine-carbothiolate 21.8 g. (0.22 mole) of hexamethyleneimine and 200 cc. of n-pentane were charged to a 500 cc. Erlenmeyer flask and 13.9 g. (0.10 mole) of isopropyl chlorothiolformate was added dropwise with ice cooling. After the addition, the mixture was worked up in the same manner as Example I. The product was not distilled but the volatiles were removed by subjecting the product to a current of air on the steam bath. There was obtained 18.8 g. (93.6% yield) of isopropyl 1-hexamethyleneiminecarbothiolate, $n_D^{30}$ 1.5080.

*Analysis.*—Calculated for $C_{10}H_{19}NOS$ (percent): N, 6.96. Found (percent): N, 7.17.

EXAMPLE VIII

Compound 6.—i-Butyl 1-hexamethyleneiminecarbothiolate

When the general procedure of Example VII was repeated except that 22.2 g. (0.224 mole) of hexamethyleneimine, 16.3 g. (0.107 mole) of isobutyl chlorothiolformate and 200 cc. of n-pentane were employed, there was obtained 20.7 g. (90.2% yield) of isobutyl 1-hexamethyleneiminecarbothiolate, B.P. (10 mm.) 153.0–154.0° C., $n_D^{30}$ 1.5047.

*Analysis.*—Calculated for $C_{11}H_{21}NOS$ (percent): N, 6.50. Found (percent): N, 6.74.

The compounds of the present invention have been extensively tested as herbicides and have been particularly evaluated as pre-emergence herbicides. Pre-emergence herbicides are ordinarily used to treat the soil in which the desired crop is to be planted or after seeding before the crop emerges. If the herbicide is harmless to the desired crop, seeds or seedlings, but phytotoxic to the weed seeds or seedlings most frequently encountered, the crop grows in a weed free environment.

The phytocidal compositions of the present invention may be applied to the soil in any of the convenient forms well known to those skilled in the art. For instance, it can be dissolved in a solvent, such as acetone, or emulsified and sprayed onto the soil; or it can be combined with a dry inert carrier and applied as a dust or as granules. The rates of application may vary widely depending on the results desired.

The phytotoxicity of the compounds of the present invention is shown by the results of the following testing method.

A quantity of Santa Cruz sandy loam soil contained in metal flats measuring 12″ by 8″ by 3″ was placed in a two-gallon capacity cement mixer and treated with a weighed amount of the test compound dissolved in .6 ml. of acetone. The compound was applied to the soil surface with a pipette at a rate of 3 lbs. of active ingredient per acre and the mixer was then rotated to insure thorough distribution of the compound throughout the soil. The treated soil was placed back in the metal flat and seeded at ½″ depth to red oats, pigweed, Sudan grass, yellow nutgrass, yellow foxtail, quack grass, water grass, and lamb's-quarter (approximately 100 seeds of each weed species). The metal flats are kept in a greenhouse and a temperature of 70–84° F. is maintained. Twenty-eight days after treatment, the percentage germination of each species is determined and recorded along with the amount of growth as compared to the germination and growth of untreated controls.

The following chart shows the results of the test mentioned supra.

| Compound No. | Rate/ acre | Red oats Ge. | Red oats Gr. | Pigweed Ge. | Pigweed Gr. | Sudan grass Ge. | Sudan grass Gr. | Yellow nutgrass Ge. | Yellow nutgrass Gr. |
|---|---|---|---|---|---|---|---|---|---|
| 1 | 3 | 100 | 2 | 100 | 10 | 100 | 7 | 0 | |
| 3 | 3 | 100 | 3 | 0 | | 100 | 0+ | 0 | |
| 4 | 3 | 100 | 2 | 100 | 3 | 100 | 1 | 0 | |
| 5 | 3 | 100 | 6 | 100 | 10 | 100 | 4 | 30 | 1 |
| 6 | 3 | 100 | 2 | 0 | | 100 | 0+ | 0 | |
| 7 | 3 | 100 | 2 | 20 | 3 | 100 | 1 | 0 | |
| 8 | 3 | 100 | 6 | 100 | 10 | 100 | 2 | 100 | 4 |

Ge.=Percentage of seeds germinating.
Gr.=Growth, wherein 10 equals normal growth, and 0 indicates no growth.

| Compound No. | Rate/ acre | Yellow foxtail Ge. | Yellow foxtail Gr. | Quack grass Ge. | Quack grass Gr. | Water grass Ge. | Water grass Gr. | Lamb's quarter Ge. | Lamb's quarter Gr. |
|---|---|---|---|---|---|---|---|---|---|
| 1 | 3 | 100 | 10 | 100 | 7 | 100 | 4 | 100 | 10 |
| 3 | 3 | 100 | 9 | 100 | 4 | 100 | 1 | 0 | |
| 4 | 3 | 100 | 0+ | 100 | 3 | 100 | 0+ | 0 | |
| 5 | 3 | 100 | 10 | 100 | 10 | 100 | 4 | 40 | 3 |
| 6 | 3 | 100 | 10 | 100 | 4 | 100 | 1 | 0 | |
| 7 | 3 | 100 | 0+ | 100 | 3 | 100 | 0+ | 0 | |
| 8 | 3 | 100 | 5 | 100 | 4 | 100 | 1 | 100 | 10 |

Ge.=Percentage of seeds germinating.
Gr.=Growth, wherein 10 equals normal growth, and 0 indicates no growth.

Comparative tests were run on compound R–1817 referred to in the previously cited prior art and Compound 2 of the present invention. In these tests, soil from the same source, seeds from the same source and duplicate growing conditions were used so that a valid comparison could be had. This procedure avoids problems of different growth rates due to different soil microorganisms, different seed batches and different climatic conditions.

The test procedure followed was the same as that given in column three of the instant specification except that the results were read thirty-two and thirty-six days after treatment.

The following chart shows the results of the tests.

| Compound No. | Rate/ acre | Weed Species Germination | Growth |
|---|---|---|---|
| | | Red oats | |
| 2 | 3 | 0 | |
| R–1817 | 3 | 20 | 5 |
| | | Pigweed | |
| 2 | 3 | 0 | |
| R–1817 | 3 | 100 | 10 |
| | | Sudan grass | |
| 2 | 3 | 0 | |
| R–1817 | 3 | 60 | 7 |
| | | Yellow nutgrass | |
| 2 | 3 | 0 | |
| R–1817 | 3 | 100 | 8 |
| | | Water grass | |
| 2 | 3 | 0 | |
| R–1817 | 3 | 100 | 3 |
| | | Foxtail | |
| 2 | 3 | 20 | 0 |
| R–1817 | 3 | 100 | 10 |

Germination refers to percentage of seeds germinating.
Growth indicates growth on a 0 to 10 scale; 0=no growth; 10=normal growth.

In addition, the compounds of the present invention are excellent selective herbicides in both rice and wheat crops since these crops are relatively unaffected by such compounds.

As described in the examples hereinbefore given, the method of making the compounds of the present invention involves reacting a lower alkyl chlorothiolformate with hexamethyleneimine in a suitable solvent such as n-pentane. An alkali may be added to the reaction materials to maintain the reaction media alkaline to increase yields.

I claim:
1. The method of controlling weeds comprising applying to the soil a phytotoxic amount of a compound having the formula:

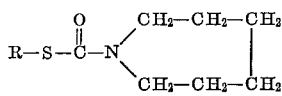

wherein R is lower alkyl.

2. The method of claim 1 wherein the compound is methyl 1-hexamethyleneiminecarbothiolate.

3. The method of claim 1 wherein the compound is ethyl 1-hexamethyleneiminecarbothiolate.

4. The method of claim 1 wherein the compound is n-propyl 1-hexamethyleneiminecarbothiolate.

5. The method of claim 1 wherein the compound is i-propyl 1-hexamethyleneiminecarbothiolate.

6. The method of claim 1 wherein the compound is n-butyl 1-hexamethyleneiminecarbothiolate.

7. The method of claim 1 wherein the compound is i-butyl 1-hexamethyleneiminecarbothiolate.

8. The method of claim 1 wherein the compound is sec-butyl 1-hexamethyleneiminecarbothiolate.

9. The method of claim 1 wherein the compound is t-butyl 1-hexamethyleneiminecarbothiolate.

References Cited

UNITED STATES PATENTS

| 2,913,327 | 11/1959 | Tilles | 71—2.7 |
| 2,992,091 | 7/1961 | Harman | 71—2.6 |
| 3,066,020 | 11/1962 | Tilles et al. | 71—2.5 |
| 3,078,153 | 2/1963 | Harman et al. | 71—2.5 |

FOREIGN PATENTS

| 1,032,023 | 12/1958 | Germany | 71—2.5 |

JAMES O. THOMAS, JR., Primary Examiner

U.S. Cl. X.R.

260—239